United States Patent
Oh (10) Patent No.: US 10,895,981 B2
(45) Date of Patent: Jan. 19, 2021

(54) WRITING PROGRAM, AND CHARACTER INPUT DEVICE EQUIPPED WITH THE SAME

(71) Applicant: Se-Ho Oh, Osan (KR)

(72) Inventor: Se-Ho Oh, Osan (KR)

( * ) Notice: Subject to any disclaimer, the term of this patent is extended or adjusted under 35 U.S.C. 154(b) by 0 days.

(21) Appl. No.: 16/287,955

(22) Filed: Feb. 27, 2019

(65) Prior Publication Data

US 2020/0159409 A1    May 21, 2020

(30) Foreign Application Priority Data

Nov. 21, 2018 (KR) .......................... 10-2018-0144762

(51) Int. Cl.
*G06F 3/0488* (2013.01)
*G06F 3/01* (2006.01)
*G06F 40/263* (2020.01)

(52) U.S. Cl.
CPC .......... *G06F 3/04886* (2013.01); *G06F 3/018* (2013.01); *G06F 40/263* (2020.01)

(58) Field of Classification Search
CPC ..... G06F 3/04886; G06F 40/263; G06F 3/018
See application file for complete search history.

(56) References Cited

U.S. PATENT DOCUMENTS

| | | | | |
|---|---|---|---|---|
| 2002/0114516 A1* | 8/2002 | Aharonson | ......... | G06F 3/04883 382/181 |
| 2005/0219226 A1* | 10/2005 | Liu | ..................... | G06F 3/04883 345/173 |
| 2006/0279559 A1* | 12/2006 | Kongqiao | ........... | G06F 3/04883 345/179 |
| 2007/0182595 A1* | 8/2007 | Ghasabian | ............ | G06F 1/1615 341/22 |
| 2008/0002888 A1* | 1/2008 | Yuan | ..................... | G06F 3/0488 382/187 |
| 2008/0115078 A1* | 5/2008 | Girgaonkar | ......... | G06F 3/04886 715/773 |
| 2008/0166049 A1* | 7/2008 | Wang | .................. | G06F 3/04883 382/189 |

(Continued)

FOREIGN PATENT DOCUMENTS

| | | |
|---|---|---|
| JP | 6131503 B2 | 5/2017 |
| KR | 1020080078336 A | 8/2008 |

(Continued)

*Primary Examiner* — Tadesse Hailu (57) ABSTRACT

Provided is a writing program for enabling accurate character recognition, and a character input device equipped with the same. The character input device includes: a storage configured to store a writing program; and an input unit configured to output the writing program to provide a character writing environment, wherein the writing program outputs the following input windows: a character output window for outputting a character input by a user, a first language input window for allowing a character written thereon by the user to be recognized as a first language, and a second language input window for allowing a character written thereon by the user to be recognized as a second language, and wherein the second language input window is distinguishable from the first language window. Accordingly, accurate character recognition may be enabled and thus errors possibly caused during character writing may be reduced.

19 Claims, 6 Drawing Sheets

(56) References Cited

U.S. PATENT DOCUMENTS

| | | | |
|---|---|---|---|
| 2008/0174561 A1* | 7/2008 | Kim | G06F 3/04883 345/173 |
| 2009/0295737 A1* | 12/2009 | Goldsmith | G06F 3/04883 345/169 |
| 2010/0177048 A1* | 7/2010 | Semenets | G06F 3/0233 345/173 |
| 2010/0245230 A1* | 9/2010 | Yaun | G06K 9/033 345/156 |
| 2013/0035143 A1* | 2/2013 | Izutsu | G06F 1/1632 455/566 |
| 2014/0028562 A1* | 1/2014 | St. Clair | G06F 3/04883 345/168 |
| 2015/0193141 A1* | 7/2015 | Goldsmith | G06F 3/04883 345/173 |
| 2017/0131897 A1* | 5/2017 | Morita | G06F 3/0418 |
| 2019/0204934 A1* | 7/2019 | Lee | G06F 3/01 |
| 2019/0339859 A1* | 11/2019 | Lee | G06F 3/04886 |

FOREIGN PATENT DOCUMENTS

| | | |
|---|---|---|
| KR | 20100038853 | 4/2010 |
| KR | 1020140135612 A | 11/2014 |

* cited by examiner

WRITING PROGRAM, AND CHARACTER INPUT DEVICE EQUIPPED WITH THE SAME

CROSS-REFERENCE TO RELATED APPLICATIONS

This application claims priority to Korean Patent Application No. 10-2018-0144762 filed on Nov. 21, 2018 the entire disclosure of which is incorporated by reference herein.

BACKGROUND OF THE INVENTION

Field of the Invention

The present invention relates to a writing program and a character input device equipped with the same, and more particularly to a writing program for inputting characters and a character input device equipped with the same.

Related Art

A character input device for inputting characters, such as a smart phone and a tablet PC, is provided with various means to input characters. Generally, the character input device outputs a keypad on a display, so that characters are input based on a combination of characters selected by a user.

Such a character inputting method has been already published by Korean Patent Application Publication No. 2010-0038853 (Titled with "METHOD FOR INPUTTING CHARACTERS IN TERMINAL" and published on Apr. 15, 2010). However, a variety of character inputting methods have been recently used, which includes not just the existing character inputting method based on a keypad, but also a character inputting method based on a voice and a character inputting method implemented by directly writing characters.

For example, a method which enables a user to write characters directly on a display to input the characters to a character input device has been used. However, when the user write characters on his own, the character input device may sometimes recognize the characters incorrectly. This may result in an error of inputting characters.

PRIOR ART DOCUMENT

Patent Document

Korean Patent Application Publication No. 2010-0038853 (Titled with "METHOD FOR INPUTTING CHARACTERS IN TERMINAL" and published on Apr. 15, 2010)

SUMMARY OF THE INVENTION

The present invention provides a writing program enabling correct character recognition, and a character input device equipped with the same.

In one general aspect of the present invention, there is provided a character input device including: a storage configured to store a writing program; and an input unit configured to output the writing program to provide a character writing environment, wherein the writing program outputs the following input windows: a character output window for outputting a character input by a user, a first language input window for allowing a character written thereon by the user to be recognized as a first language, and a second language input window for allowing a character written thereon by the user to be recognized as a second language, and wherein the second language input window is distinguishable from the first language input window.

The writing program may further output the following input windows: a number input window which is distinguishable from the first language input window and the second language input window, and which allows a character written thereon by the user to be recognized as a number; and a mark input window which is distinguishable from the first language input window, the second language input window, and the number input window, and which allows a character written thereon by the user to be recognized as a mark.

The writing program may further output a third language input window which is distinguishable from the first language input window, the second language input window, the number input window, and the mark input window, and which allows a character written thereon by the user to be recognized as a third language.

The first language may be a mother language of the user, the second language may be a first foreign language, and the third language may be a second foreign language.

An area of the first language input window may be larger than an area of the second language input window and an area of the third language input window.

The user may be allowed to adjust areas of the first language input window, the second language input window, and the third language input window.

When the user writes a mark in an upper area of the mark input window, the mark input window may allow the mark to be recognized as an upper mark, and, when the user writes a mark in a lower area of the mark input window, the mark input window may allow the mark to be recognized as a lower mark.

When the user writes a mark in a middle area of the mark input window, the mark input window may allow the mark to be recognized as a middle mark.

The number input window and the mark input window may be output to be adjacent to each other, and, when the user writes a mark in an area where the number input window and the mark input window overlap each other, the mark may be recognized as a middle mark.

The first language may be a mother language of the user, the second language may be a foreign language, and an area of the first language input window may be larger than an area of the second language input window.

At least one of the first language input window or the second language input window may allow a character written by the user to be recognized as an uppercase or a lowercase.

The at least one of the first language input window or the second language input window may output the following input windows: a lowercase input window for allowing a character written thereon by the user to be recognized as a lowercase; and an uppercase input window for allowing a character written thereon by the user to be recognized as an uppercase, the uppercase input window which is distinguishable from the lowercase input window.

An area of the lowercase input window may be larger than an area of the uppercase input window.

The at least one of the first language input window or the second language input window may allow a character written thereon by the user to be recognized as an uppercase when a size of the character is equal to or greater than a predetermined size, and the at least one of the first language input window or the second language input window may allow a character written thereon by the user to be recognized as a lowercase when the size of the character is smaller than the predetermined size.

The user may be allowed to adjust a size of the first language input window and a size of the second language input window.

The user may be allowed to select languages to be recognized in the first language input window and the second language input window, respectively.

The writing program may enable accuracy in recognition of a character to be written by the user to change.

When the recognition accuracy is increased, the writing program may recognize character writing by the user as it is, and, when the recognition accuracy is decreased, the writing program may anticipate a highly similar character from among stored characters in consideration of character writing style of the user and output the anticipated character.

In another general aspect of the present invention, there is provided a writing program for implementing a character writing environment in a character input device, the program which outputs all of the following: a character input window for outputting a character input by a user; a first language input window for allowing a character written thereon by the user to be recognized as a first language; a second language input window for allowing a character written thereon by the user to be recognized as a second language, wherein the second language input window is distinguishable from the first language input window.

DESCRIPTION OF EXEMPLARY EMBODIMENTS

Hereinafter, embodiments of the present invention will be described in detail with reference to the accompanying drawings. However, the present embodiments are not limited to the disclosed embodiments, but may be implemented in various ways. The present embodiments are provided to complete the disclosure of the present invention and to allow those having ordinary skill in the art to fully understand the scope of the present invention. The shapes of elements in the drawings may be enlarged in order to highlight a clearer description, and like reference numerals are used throughout the drawings to refer to like elements.

Figure 1:
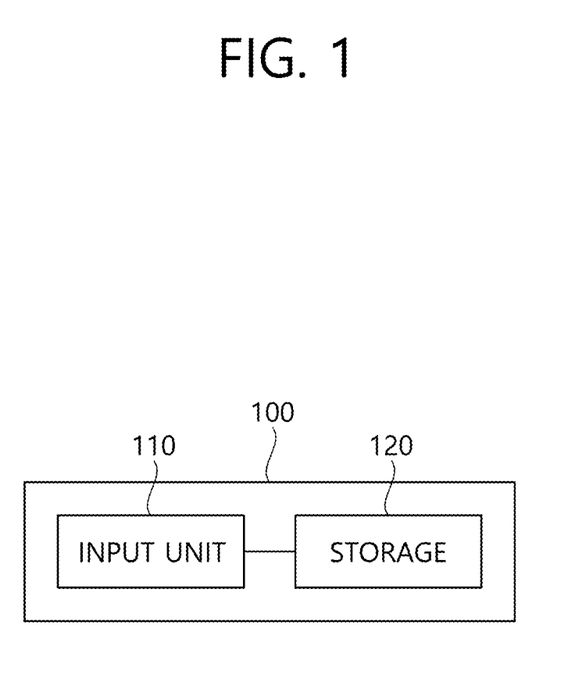
FIG. 1 is a diagram schematically illustrating a configuration of a character input device according to an embodiment of the present invention.

FIG. 1 is a diagram schematically illustrating a configuration of a character input device according to an embodiment of the present invention.

As illustrated in FIG. 1, a character input device 100 according to an embodiment of the present invention may be any of various electronic devices which requires inputting of characters, for example, a smart phone, a mobile terminal, a computer, a laptop, etc.

The character input device 100 may include an input unit 110 and a storage 120.

The input unit 110 is provided in the character input device 100. The input unit 110 forms an area where a user is allowed to input a character. Here, the input unit 110 may be a display panel or a touch panel provided in the character input device 100. Accordingly, the user inputs a character to the character input device 100 using the input unit 110.

The storage 120 may be included in the character input device 100. However, this is merely an example of the present invention, and the storage 120 may be a server provided in an Internet environment, such as a Cloud.

The storage unit 120 may be equipped with a writing program that provides a character input environment on the input unit 110. Accordingly, when a user calls the writing program using the input unit 110, the storage unit 120 outputs the stored writing program on the input unit 110. The writing program may be called on various environments such as a message writing environment, a game environment, and a web environment, and may be called together with a different program.

The writing program may output a first character input mode 10 or a second character input mode 20 on the input unit 110 depending on selection of the user.

Figure 2:
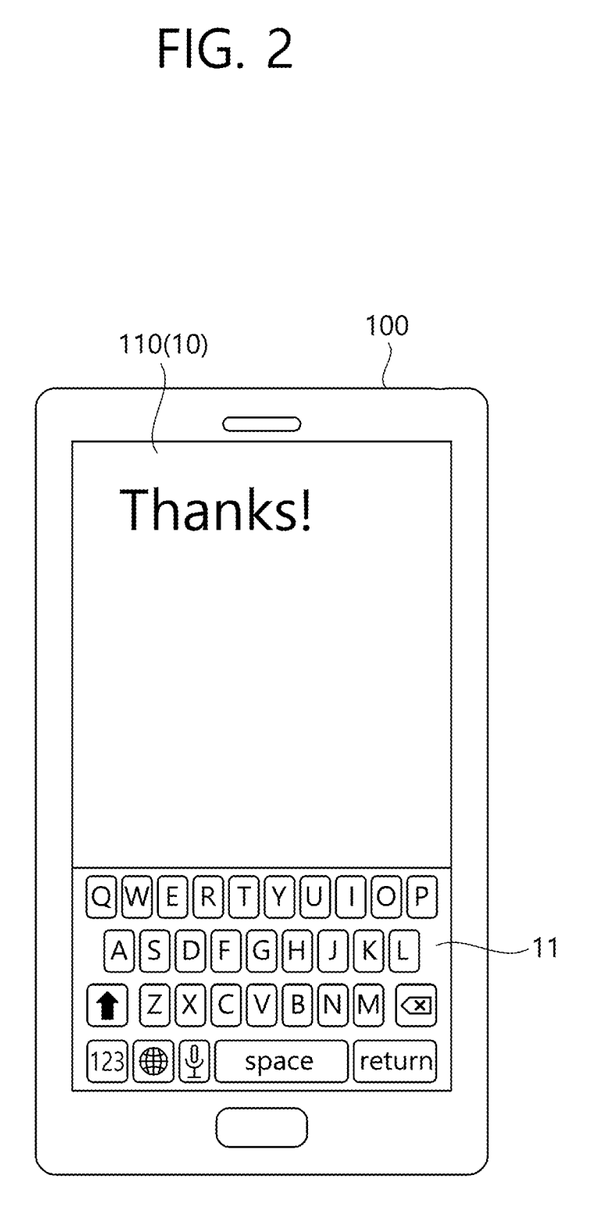
FIG. 2 is a conceptual diagram schematically illustrating a first character input mode according to an embodiment of the present invention.
Figure 3:
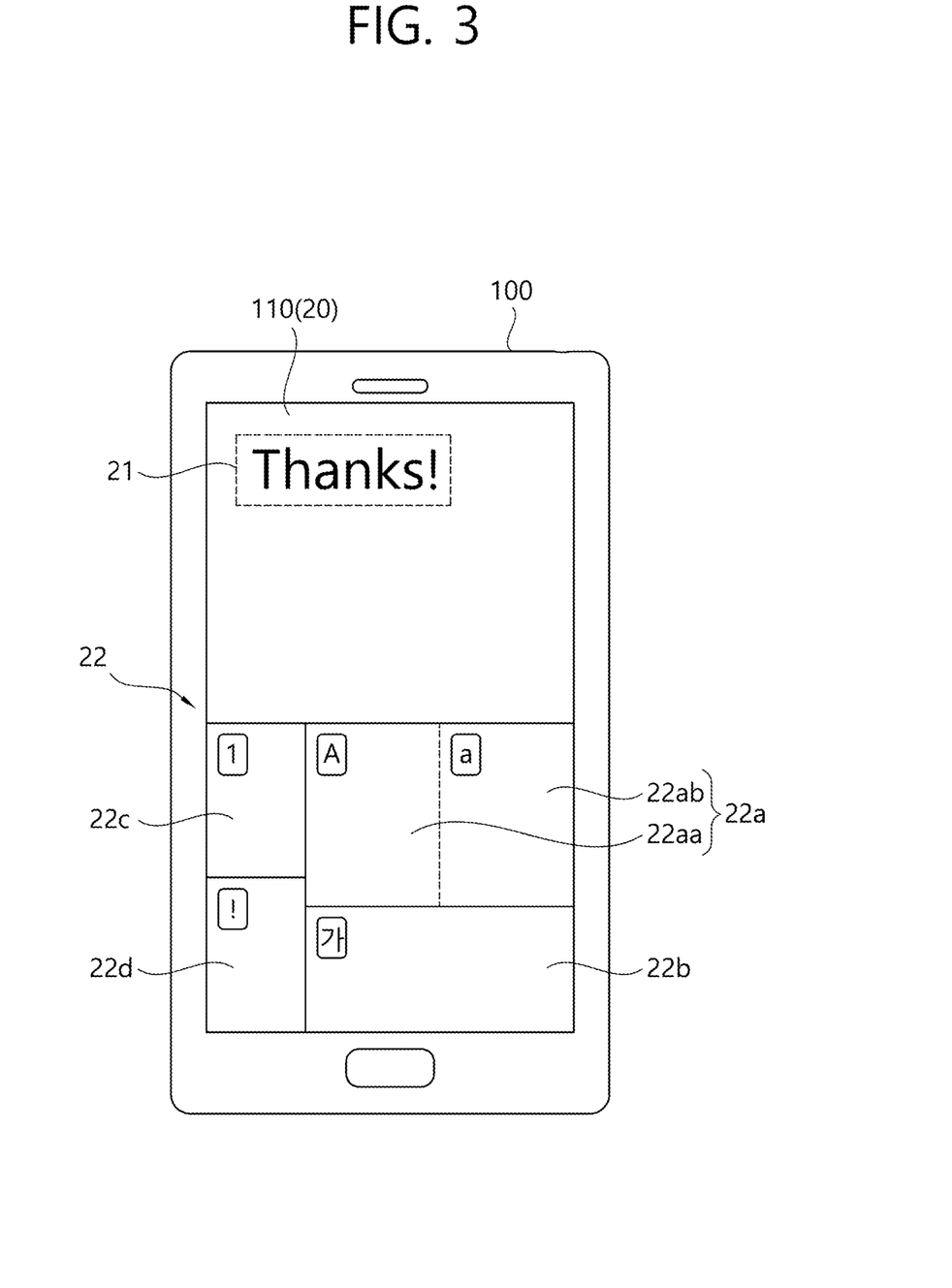
FIG. 3 is a conceptual diagram schematically illustrating a second character input mode according to an embodiment of the present invention.

FIG. 2 is a conceptual diagram schematically illustrating a first character input mode according to an embodiment of the present invention, and FIG. 3 is a conceptual diagram schematically illustrating a second character input mode according to an embodiment of the present invention.

As illustrated in FIGS. 2 and 3, the first character input mode 10 and the second character input mode 20 may be called in the character input device 100, depending on selection of a user.

The first character input mode 10 enables a plurality of character symbols to be output on the input unit 110. For example, in the first character input mode 10, character symbols may be output in the form of a keypad 11. Then, a user may select a character output on the input unit 110, so that a desired sentence formed of a combination of selected characters is output on the input unit 110.

However, this is merely an example of the present invention, and the first character input mode 10 may enable characters to be output based on a user's voice and does not limit a character inputting method.

In addition, the second character input mode 20 may enable a user to write a character directly on the input unit 110. Here, character writing may be performed using the user's finger or a pen-type character writing tool. The second character input mode 20 recognizes an input character correctly so that inputting of a wrong character is prevented. In addition, the second character input mode 20 may provide various language input environments.

In the second character input mode 20, a character output window 21 and a character input windows 22 divided into multiple parts are called on the input unit 110.

The text output window 21 outputs a character written by the user. That is, the character output window 21 may enable the user to write a character while checking an input character in real time.

In addition, the character input window 22 divided into multiple parts may prevent that a character written by a user is recognized incorrectly. Such a plurality of character input windows 22 is output on the input unit 110 to neighbor the character output window 21.

Here, sizes of the plurality of the character input windows 22 may be adjustable by a user, and type of languages to be input to the plurality of the character input windows 22 may be selected by the user on his own.

For example, the plurality of character input windows 22 may include first to fourth character input windows 22a, 22b, 22c, and 22d. The first character input window 22a recognizes character writing of the user as a first language, the second character input window 22b recognizes character writing of the user as a second language, the third character input window 22c recognizes character writing of the user as a number, and the fourth character input window 22d recognizes character writing of the user as a mark.

Here, the first character input window 22a may be a window for recognizing the first language which is the most frequently used by the user, and the first language may be, for example, the user's mother language. Accordingly, the first character input window 22a may be output with the largest area under the character output window 21 by taking into consideration of the frequency of use of the first character input window 22a.

In addition, the user needs to write uppercase and lowercase forms distinguishably when inputting the first language. Accordingly, the uppercase and lowercase forms may be recognized on the first character input window 22a in various ways.

The first character input window 22a may be divided into an uppercase recognition window 22aa where a character written thereon is recognized as an uppercase, and a lowercase recognition window 22ab where a character written thereon is recognized as a lowercase. Here, the first character input window 22a may be provided so as to make it easy to write lowercases which is more frequently used than uppercases. To this end, the lowercase recognition window 22ab may be output with an area larger than an area of the uppercase recognition window 22aa.

In addition, the first character input window 22a may recognize an uppercase or a lowercase depending on a size of a character written by a user. For example, the user may set 1 cm as a threshold size for discrimination between uppercases and lowercases. Thus, if the user writes a character in a size equal to or greater than 1 cm, the character input device 100 may recognize the character as an uppercase. If the user writes a character in a size smaller than 1 cm, the character input device 100 may recognize the character as a lowercase.

Meanwhile, the second character input window 22b may be a window for a second language, and the second language may be, for example, a foreign language. The second language input window 22b is output under the first character input window 22a. The second character input window 22b recognizes an input character as the second language. Accordingly, the second character input window 22b prevents wrong recognition that can be caused by similarity between the first language and the second language. For example, in an existing character input method, the character input device 100 may be confused with Korean character "l" and English character "I". However, the second character input window 22b is output on the input unit 110 as an additional area linguistically distinguishable from the first character input window 22a. Accordingly, the second character input window 22b may prevent wrong recognition of a character.

In addition, the third character input window 22c may be a window for writing a number. The third character input window 22c is output on one side of the first character input window 22a. Here, the third character input window 22c may be output on the input unit 110 with an area relatively smaller than those of the first character input window 22a and the second character input window 22b by taking into consideration of the frequency of use of the third character input window 22c. The third character input window 22c may recognize a character input thereto as a number, thereby preventing wrong recognition possibly that can be caused by similarity of the first language, the second language, and numbers.

For example, in an existing character input method, the character input device 100 may be confused with Korean character "l", English character "I", and number "1". However, the third character input window 22c is output on the input unit 110 as an additional area distinguishable from the first character input window 22a and the second character input window 22b. Accordingly, the third character input window 22c may prevent wrong recognition of a character.

The fourth character input window 22d may be a window for writing a mark. The fourth character input window 22d may be output on one side of the second character input window 22b and under the third character input window 22c. Here, the fourth character input window 22d may be output on the input unit 110 with an area relatively smaller than those of the first character input window 22a and the second character input window 22b by taking into consideration of frequency of use of the fourth character input window 22d. The fourth character input window 22d may recognize a character input thereto as a mark, thereby preventing wrong recognition that can be caused by similarity of the first language, the second language, a number, and a mark.

Here, the fourth character input window 22d may recognize a different mark depending a position where a user inputs a character. For example, an existing character input device may be confused with a comma (,), a quotation mark (" ") or (' '), a hyphen (-), and an underline (_). Accordingly, the fourth character input window 22d may increase accuracy in recognition of a mark based on a position where a user writes a character.

If the user writes a character in an upper area of the fourth character input window 22d, the character input device 100 may recognize the written character as an upper mark. For example, the upper mark may be double typographic quotes (" "), single typographic quotes (' '), etc.

In addition, if the user writes a character in a lower area of the fourth character input window 22d, the character input device 100 recognizes the written character as a lower mark. For example, the lower mark may be a period (.), a comma (,), an underscore (_) a circle period (ₒ), etc.

In addition, if the user writes a character in a middle area of the fourth character input window 22d, the character input device 100 recognizes the written character as a middle mark such as a hyphen (-) and a bullet (•). However, in order to enhance accuracy in recognition of a mark, even when the user inputs a character in an area where the third character input window 22c and the fourth character input window 22d overlap, the character input device 100 may recognize the position of the mark as middle.

Meanwhile, the size or position of the first to fourth character input windows 22d may be arbitrarily adjustable by a user. In addition, the character input device 100 may enable a user to select types of languages to be recognized in the first character input window 22a and the second character input window 22b. For example, the languages may change to Korean, English, Chinese, Japanese, Spanish, or any one of various languages.

In addition, the writing program may set accuracy in recognition of character writing of a user.

For example, if a user increase the recognition accuracy or set the recognition accuracy to 100%, the writing program may recognize character writing of the user as it is. In contrast, if the user decreases the recognition accuracy, the writing program anticipates a highly similar character from among stored characters in consideration of character writing style of the user and outputs the anticipated character.

Meanwhile, in the present embodiment, the character input device 100 outputs the plurality of character input windows 22 on the input unit 110 in order to recognize character writing of a user without confusion. However, the character input device 100 may output a single input window for a user to write a character. In this case, the character input device 100 may recognize the character writing without confusion using a pen-type character writing tool.

Figure 4:
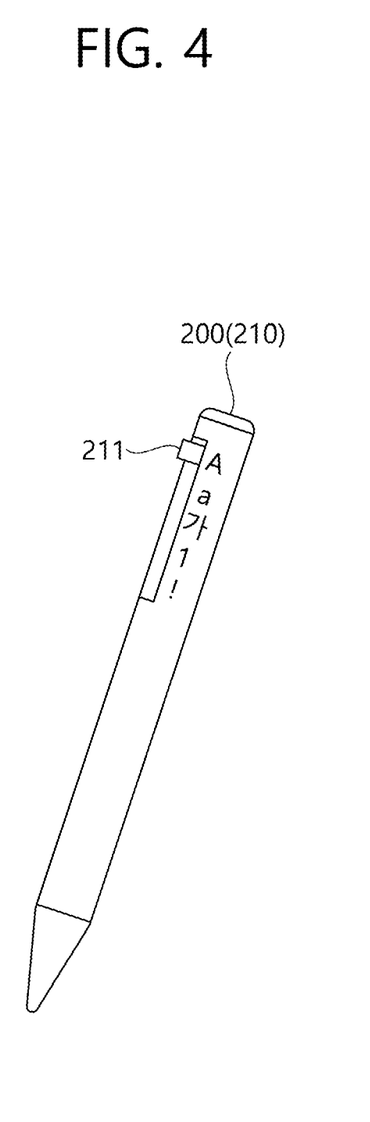
FIG. 4 is a perspective view schematically illustrating a character writing tool according to an embodiment of the present invention.

FIG. 4 is a perspective view schematically illustrating a character writing tool according to an embodiment of the present invention.

As illustrated in FIG. 4, a character writing tool 200 according to an embodiment of the present invention may be in the form of a pen. The character writing tool 200 may include a main body 210 that defines an external appearance of the character writing tool 200.

The main body 210 is provided with a switch 211. The switch 211 enables character writing with the character writing tool 210 to be distinguished as the first language, the second language, numbers, or marks and output on the character input device 100.

For example, when the switch 211 is located at a first position related to output of the first language, the character input device 100 recognizes that a character written with the character writing tool 200 is the first language. When the switch 211 is located at a second position related to output of the second language, the character input device 100 recognizes that a character written with the character writing tool 200 is the second language. When the switch 211 is located at a third position related to output of a number, the character input device 100 recognizes that a character written with the character writing tool 200 is a number. When the switch 211 is located at a fourth position related to output of a mark, the character input device 100 recognizes that a character written with the character writing tool 200 is a mark.

Meanwhile, a method for inputting a character using a character input device will be hereinafter described in more detail with reference to the accompanying drawings. However, the aforementioned elements are not described in detail again, and like reference numerals refer to like elements.

Figure 5:
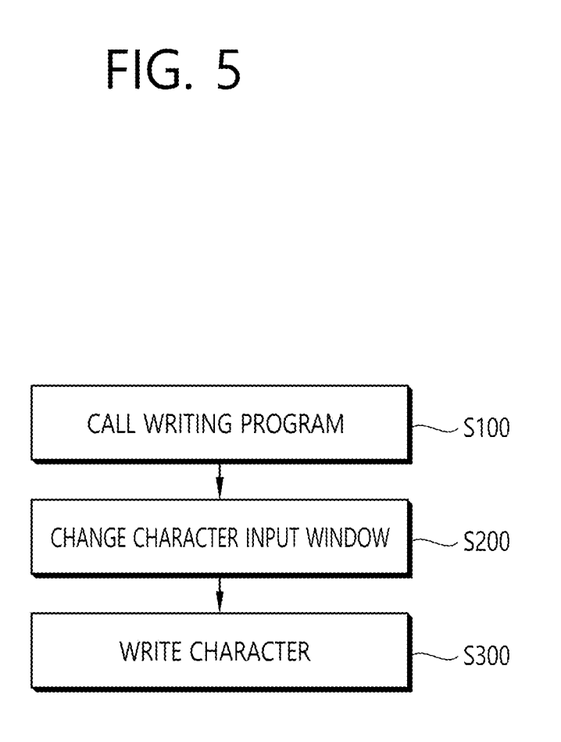
FIG. 5 is a flowchart illustrating a method of inputting a character according to an embodiment of the present invention.

FIG. 5 is a flowchart illustrating a method of inputting a character according to an embodiment of the present invention.

As illustrated in FIG. 5, the character input device 100 according to an embodiment of the present invention calls a writing program upon selection of a user to output the first character input mode 10 or the second character input mode 20 on the input unit 110 (S100).

When the user selects the first character input mode 10, the user combines characters in the environment of the keypad 11 to output a desired sentence.

In addition, when the user selects the second character input mode 20, the user may writes a character on the input unit 110 with the user's finger or the character writing tool 200. The character input device 100 outputs the written character on a character output window 21.

More specifically, when the user selects the second character input mode 20, the plurality of character input windows 22 is called together with the character output window 21. For example, the plurality of character input windows 22 may be called in the form of the first to fourth character input windows 22a, 22b, 22c, and 22d. Here, the user may arbitrarily adjust the size of the first to fourth character input windows 22a, 22b, 22c, and 22d through the input unit 220 (S200).

Then, the first character input window 22q prepares to recognize writing of a character in the first language, and the second character input window 22b prepares to recognize writing of a character as the second language. In addition, the third character input window 22c prepares to recognize writing of a character as a number, and the third character input window 22d prepares to recognize writing of a character as a mark.

Figure 6:
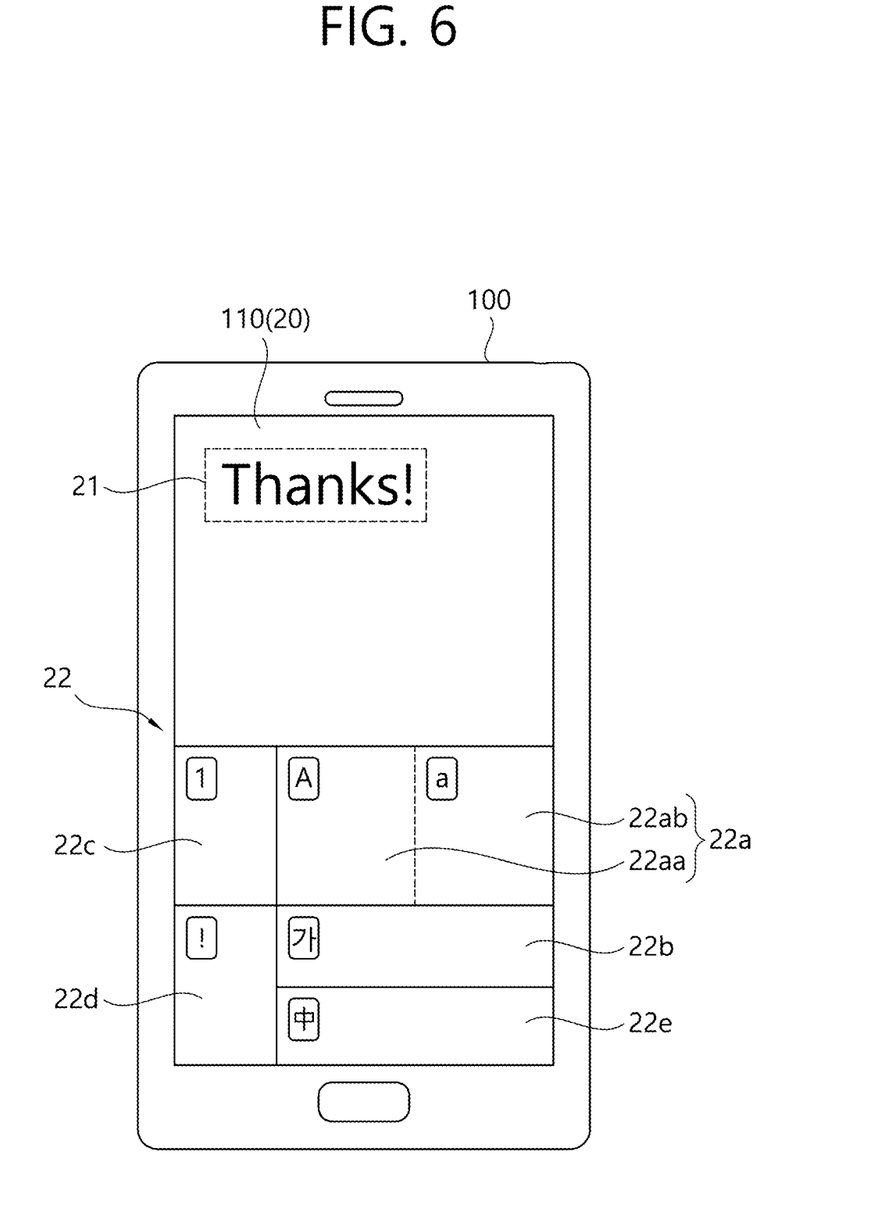
FIG. 6 is a conceptual diagram schematically illustrating a second character input mode according to another embodiment of the present invention.

However, when necessary, a user may change the number of character input windows and types of languages to be recognized in the plurality of character input windows 22. For example, as illustrated in FIG. 6, the user may set the first character input window 22a to recognize the first language which is the user's mother language, set the second character input window 22b to recognize the second language which is the first foreign language, set the third character input window 22c to recognize the third language which is the second foreign language, set the fourth character input window 22d to recognize a number, and set a fifth character input window 22e to recognize a mark.

Meanwhile, when the plurality of character input windows 22 is called, the user may write the first language, the second language, a number, and a mark on his own on the first to fourth character input windows 22a, 22b, 22c, and 22d, respectively, so that desired characters are input to the character input device 100. Accordingly, the writing program may combine the written characters to write a sentence desired by the user (S300).

The writing program and the character equip device equipped with the same according to the present invention enable accurate character recognition, thereby reducing errors which can occur during character writing.

The exemplary embodiments of the present invention described above shall not be interpreted as limiting the technical spirit of the present invention. The scope of protection of the present invention is only limited to what is set forth in the scope of the claims, and a person having ordinary skill in the art to which the present invention pertains will be able to modify the technical spirit of the present invention into various forms. Accordingly, such modifications and changes, when being obvious to a person having ordinary skill in the art, shall fall within the scope of protection of the present invention.

The writing program and the character input device equipped with the same according to the present invention enables accurate character recognition, thereby reducing errors which can occur during character writing.

Effects of the present invention should not be limited to the aforementioned effects and other unmentioned effects will be clearly understood by those skilled in the art from the claims.

What is claimed is:

1. A character input device comprising:
a storage configured to store a writing program; and
an input unit configured to display an output of the writing program to provide a character writing environment,
wherein the writing program is configured to:
output a character output window for outputting a character input by a user,
output a first language input window for allowing a character written thereon to be recognized according to a first language,
output a second language input window for allowing a character written thereon to be recognized according to a second language,
output a mark input window which is distinguishable from the first language input window and the second language input window, which allows a character written thereon to be recognized as a mark,
recognize the character as a character of the first language when the character is written by the user on the first language input window,
recognize the character as a character of the second language when the character is written by the user on the second language input window,
recognize the character as a mark character when the character is written by the user on the mark input window,
recognize the character as an upper mark when the user writes the character in an upper area of the mark input window, and
recognize the character as a lower mark when the user writes the character in a lower area of the mark input window, and
wherein the second language input window is distinguishable from the first language window.

2. The character input device of claim 1, wherein the writing program is further configured to:
output a number input window which is distinguishable from the mark input window, the first language input window and the second language input window, and which allows a character written thereon to be recognized as a number; and
recognize the character as a number character when the character is written by the user on the number input window.

3. The character input device of claim 2, wherein the writing program is further configured to:
output a third language input window which is distinguishable from the first language input window, the second language input window, the number input window, and the mark input window, and which allows a character written thereon to be recognized as a third language, and
recognize the character as a character of the third language when the character is written by the user on the third language input window.

4. The character input device of claim 3, wherein the first language is a mother language of the user, the second language is a first foreign language, and the third language is a second foreign language.

5. The character input device of claim 4, wherein an area of the first language input window is larger than an area of the second language input window and an area of the third language input window.

6. The character input device of claim 4, wherein the writing program is further configured to allow the user to adjust areas of the first language input window, the second language input window, and the third language input window.

7. The character input device of claim 2, wherein the writing program is further configured to recognize the character as a middle mark when the user writes the character in a middle area of the mark input window.

8. The character input device of claim 2, wherein the writing program is further configured to:
output the number input window and the mark input window to be adjacent to each other, and
recognized the character as a middle mark when the user writes the character in an area overlapping both the number input window and the mark input window.

9. The character input device of claim 1,
wherein the first language is a mother language of the user, and the second language is a foreign language, and
wherein an area of the first language input window is larger than an area of the second language input window.

10. The character input device of claim 1, wherein the writing program is further configured to recognize the character as one of an uppercase character and a lower case character when the character is written in the first language input window or the second language input window.

11. The character input device of claim 10,
wherein at least one of the first language input window or the second language input window includes:
a lowercase input window for allowing a character written thereon to be recognized as a lowercase character; and
an uppercase input window for allowing a character written thereon to be recognized as an uppercase character, the uppercase input window being distinguishable from the lowercase input window, and
wherein the writing program is further configured to:
recognize the character as a lowercase character when the character is written by the user in the lowercase input window; and
recognize the character as an uppercase character when the character is written by the user in the uppercase input window.

12. The character input device of claim 11, wherein an area of the lowercase input window is larger than an area of the uppercase input window.

13. The character input device of claim 10, wherein the writing program is further configured to:
recognize the character as an uppercase character when the character is written in at least one of the first language input window or the second language input window and a size of the character is equal to or greater than a predetermined size, and
recognize the character as a lowercase character when the character is written in at least one of the first language input window or the second language input window and the size of the character is smaller than the predetermined size.

14. The character input device of claim 1, wherein the writing program is further configured to allow the user to adjust a size of the first language input window and a size of the second language input window.

15. The character input device of claim 1, wherein the writing program is further configured to allow the user to select languages to be recognized in the first language input window and the second language input window, respectively.

16. A character input device comprising:
a storage configured to store a writing program; and
an input unit configured to display an output of the writing program to provide a character writing environment,
wherein the writing program is configured to:
output a character output window for outputting a character input by a user,
output a first language input window for allowing a character written thereon to be recognized according to a first language,
output a second language input window for allowing a character written thereon to be recognized according to a second language,
recognize the character as a character of the first language when the character is written by the user on the first language input window,
recognize the character as a character of the second language when the character is written by the user on the second language input window,
allow the user to increase or decrease a recognition accuracy,
when the recognition accuracy is increased, recognize character writing by the user as it is, and
when the recognition accuracy is decreased, anticipate a highly similar character from among stored characters in consideration of a character writing style of the user and output the anticipated character,
wherein the second language input window is distinguishable from the first language window.

17. A non-transitory computer readable medium comprising a writing program for implementing a character writing environment in a character input device, wherein the writing program when executed configures the character input device to perform acts comprising:
outputting a character input window for outputting a character input by a user;
outputting a first language input window for allowing a character written thereon to be recognized according to a first language;
outputting a second language input window for allowing a character written thereon to be recognized according to a second language, wherein the second language input window is distinguishable from the first language input window;
outputting a mark input window which is distinguishable from the first language input window and the second language input window, which allows a character written thereon to be recognized as a mark;
recognizing the character as a character of the first language when the character is written by the user in the first language input window;
recognizing the character as a character of the second language when the character is written by the user in the second language input window;
recognizing the character as a mark character when the character is written by the user on the mark input window;
recognizing the character as an upper mark when the user writes the character in an upper area of the mark input window; and
recognizing the character as a lower mark when the user writes the character in a lower area of the mark input window.

18. The non-transitory computer readable medium of claim 17, wherein the acts further comprise:
outputting a number input window which is distinguishable from the mark input window, the first language input window, and the second language input window; and
recognizing the character as a number character when the character is written by the user in the number input window.

19. The non-transitory computer readable medium of claim 17, wherein recognizing the character as a character of the first language includes recognizing the character as an uppercase character or a lower case character according to a size of the character.

* * * * *